US007338068B2

United States Patent
Kawai et al.

(10) Patent No.: US 7,338,068 B2
(45) Date of Patent: Mar. 4, 2008

(54) GARNISH CLIP FOR CURTAIN SHIELD AIRBAG

(75) Inventors: Yasuhiro Kawai, Toyohashi (JP); Koya Teshima, Anjo (JP)

(73) Assignee: Newfrey LLC, Newark, DE (US)

( * ) Notice: Subject to any disclaimer, the term of this patent is extended or adjusted under 35 U.S.C. 154(b) by 243 days.

(21) Appl. No.: 11/152,507

(22) Filed: Jun. 15, 2005

(65) Prior Publication Data
US 2005/0285375 A1   Dec. 29, 2005

(30) Foreign Application Priority Data
Jun. 24, 2004   (JP) ............................. 2004-186692

(51) Int. Cl.
*B60R 21/16* (2006.01)
(52) U.S. Cl. ...................... 280/728.2; 24/297
(58) Field of Classification Search ............ 280/730.2, 280/728.2; 24/297, 453; 411/508, 999
See application file for complete search history.

(56) References Cited

U.S. PATENT DOCUMENTS

| 2,937,834 | A | 5/1960 | Orenick et al. |
| 5,419,584 | A | 5/1995 | Halford |
| 6,394,695 | B1 | 5/2002 | Chausset .................... 403/397 |
| 6,431,585 | B1 * | 8/2002 | Rickabus et al. ........ 280/728.3 |
| 7,155,783 | B2 | 1/2007 | Nessel et al. |
| 7,178,205 | B2 | 2/2007 | Nessel et al. |
| 7,207,529 | B2 | 4/2007 | Rosemann et al. |

FOREIGN PATENT DOCUMENTS

| JP | 2002-211345 | 7/2002 |
| JP | 2003-104156 | 4/2003 |

* cited by examiner

*Primary Examiner*—Paul N. Dickson
*Assistant Examiner*—Robert A. Coker
(74) *Attorney, Agent, or Firm*—Miles & Stockbridge P.C.

(57) ABSTRACT

A garnish clip comprises a body attachment portion for attachment to a vehicle body and a garnish attachment portion for attachment to a garnish. The garnish attachment portion comprises a plate-shaped base with one end connected to the body attachment portion and a plate-shaped garnish engagement portion connected to the other end of the base by a U-shaped connection. The garnish engagement portion is latched to a head of the body attachment portion. Ribs on the garnish attachment portion provide rigidity to limit opening of the garnish engagement portion away from the head when the airbag deploys and the latch is released by collision or roll-over forces.

7 Claims, 6 Drawing Sheets

GARNISH CLIP FOR CURTAIN SHIELD AIRBAG

CROSS-REFERENCE TO RELATED APPLICATION

This application claims the benefit of Japanese Patent Application No. 2004-186692 filed Jun. 24, 2004, incorporated herein by reference.

BACKGROUND OF THE INVENTION

The present invention relates to a garnish clip for attaching a curtain shield airbag to a portion of a vehicle body such as a front pillar of a car.

A device for attaching a curtain shield airbag to a front pillar with a garnish is disclosed in Japanese Unexamined Patent Application Publication [Kokai] No. 2002-211345 (Patent Document 1). A portion of the curtain shield airbag extending towards the front pillar is housed and held by a movable portion of the garnish that forms deployment space. In Patent Document 1, the garnish is secured to the pillar by a nut and a bolt. The curtain shield airbag can be deployed to protect the head of a vehicle occupant if a collision or rollover occurs.

A garnish for attaching a curtain shield airbag to a pillar is also disclosed in Kokai No. 2003-104156 (Patent Document 2). The garnish consists of a face and a bracket. A portion of the bracket is fixed to the face, and another portion detachably engages the face. The bracket has an engagement portion that is mounted in a pillar mounting hole at the position of a detachable connector. The curtain shield airbag is surrounded by the face and the bracket to house and hold the airbag in place. When the curtain shield airbag is deployed, the detachable connector comes off.

A clip is disclosed in U.S. Pat. No. 6,394,695 (Patent Document 3) in which trim such as a garnish is fastened near a pillar so that the garnish does not fly off when it is released from the pillar for rapid deployment of a curtain shield airbag. The clip consists of a first male portion for snapping the clip into a hole in the pillar, a female portion that is snapped into the trim, and a second male portion that extends from the first male portion and is snapped into the female portion and connected to the trim via the female portion. A flexible strap connects the first male portion and the female portion. When the female portion separates from the second male portion, the strap keeps the trim from flying off the pillar.

The attachment structures for curtain shield airbags disclosed in Patent Documents 1-3 keep a garnish from flying off a pillar in the direction of a vehicle occupant when a curtain shield airbag is deployed, and improve the safety of a vehicle occupant, but all have deficiencies. The garnish in Patent Document 1 has to be attached using nuts and bolts. This operation makes an automobile assembly line more complex and is time-consuming because of the complexity of the operation. Also, the attachment portion of the garnish has to have a specific configuration in order to ensure that there is enough space for curtain shield airbag deployment. In Patent Document 2, the garnish is attached using a bracket and a garnish face which have to be secured tightly at multiple points—a complicated operation. The clip in Patent Document 3 snaps into place, but the attachment operation is troublesome, because the strap has to be folded properly.

BRIEF DESCRIPTION OF THE INVENTION

An object of the present invention is to provide a garnish clip with a simple configuration that holds a curtain shield airbag, that can be attached easily to a portion of a vehicle body such as a pillar, and that minimizes movement of the garnish in the direction of a vehicle occupant, by restricting movement of the garnish away from the vehicle body when a curtain shield airbag is deployed.

In one non-limiting embodiment, the present invention provides a garnish clip for attaching a garnish that houses a portion of a curtain shield airbag to a portion of a vehicle body such as a pillar, wherein the clip comprises a body attachment portion attached to a vehicle body and a garnish attachment portion attached to a garnish. The garnish attachment portion comprises a plate-shaped base connected at one end to the body attachment portion, and connected at an opposite end to a plate-shaped garnish engagement portion by a U-shaped connection, so as to oppose the base. A latch having cooperable parts on the garnish engagement portion and the body attachment portion joins the garnish engagement portion to the body attachment portion. The latch is released when an impact force is sustained by the deployment of the curtain shield airbag. The garnish attachment portion has sufficient rigidity to limit opening of the garnish engagement portion away from the body attachment portion when the latch is released.

The clip is easily attached to a pillar by the body attachment portion without the use of nuts and bolts. The garnish is also easily attached to the garnish attachment portion. The garnish engagement portion restrains the airbag until the latch is released. Then the garnish engagement portion moves slightly away from the base to provide space between the garnish and the vehicle body for the deployment of the curtain shield airbag. After deployment, further movement of the garnish engagement portion is resisted. This prevents the garnish from coming off the vehicle body and restrains movement of the garnish in the direction of a vehicle occupant.

DETAILED DESCRIPTION OF THE INVENTION

The following is an explanation of a non-limiting example of the present invention with reference to the drawings.

Figure 1:
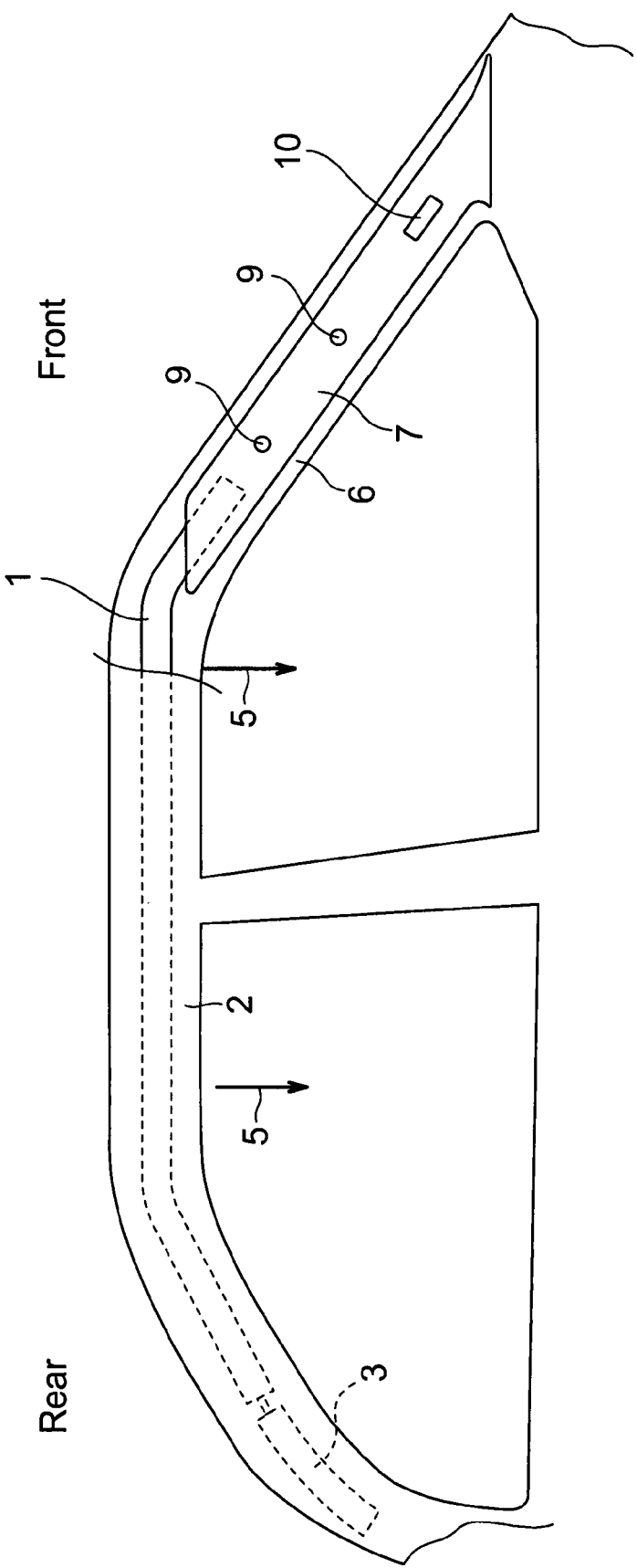
FIG. 1 is a diagram showing a garnish attached to a front pillar of a vehicle using a clip of the invention and showing a curtain shield airbag attached to the body of the vehicle.

FIG. 1 shows how a curtain shield airbag 1 is attached to a vehicle such as an automobile. Because a curtain shield airbag primarily protects the head of a vehicle occupant, it is housed and held in a portion of the vehicle body such as the upper rail of a door window, from front to rear in a manner concealed from a vehicle occupant. Impact on the vehicle in a collision or rollover causes gas from a compressed gas source 3 (called an inflator) to rapidly deploy the curtain shield airbag downward (in the direction of arrows 5) along the door window in order to protect the head of a vehicle occupant. A portion of the curtain shield airbag 1 is housed in and held by a garnish 7 in the front pillar 6 at the front of the vehicle body. In this example, the garnish 7 is detachably attached along the front pillar 6 using simple push-in fasteners 9 and the garnish clip 10 of the present invention.

Figure 2:
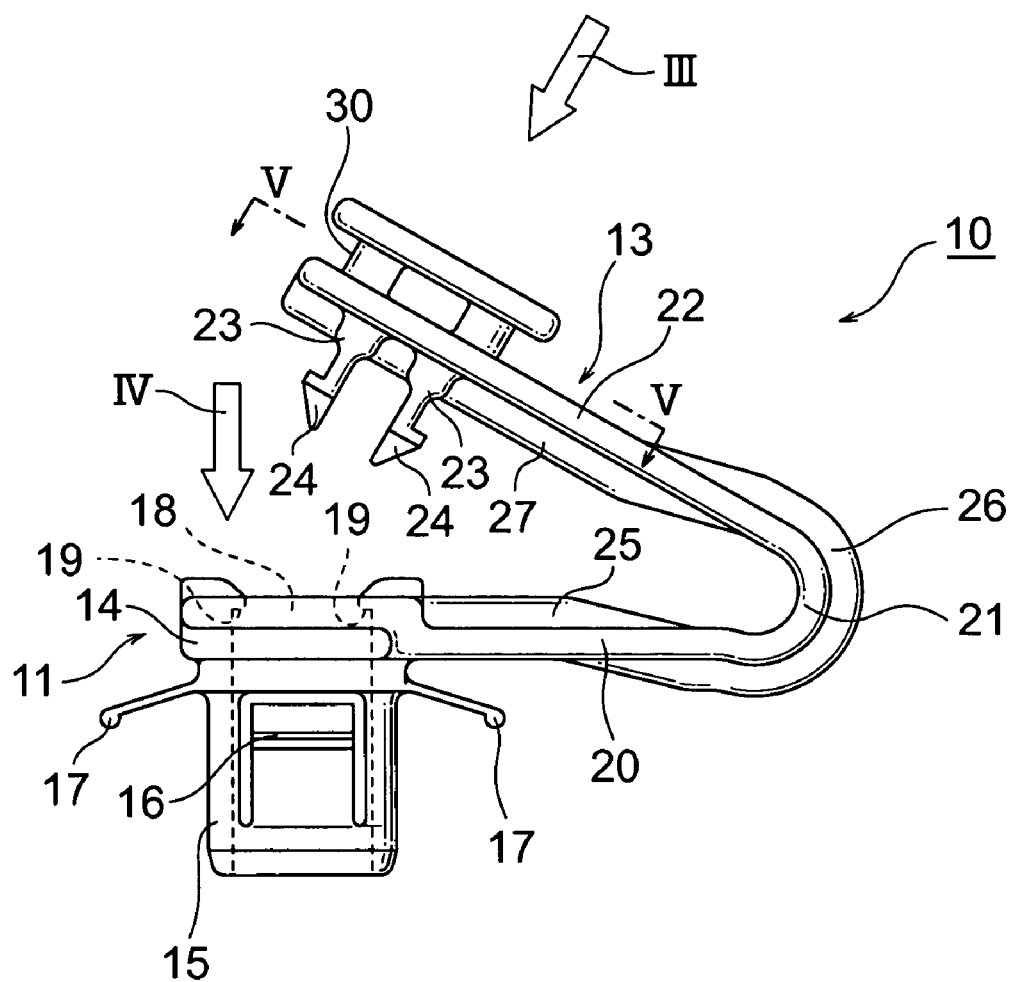
FIG. 2 is a front view of the garnish clip in a first example of the present invention before the latch is engaged to latch the garnish engagement portion to the body attachment portion.
Figure 3:
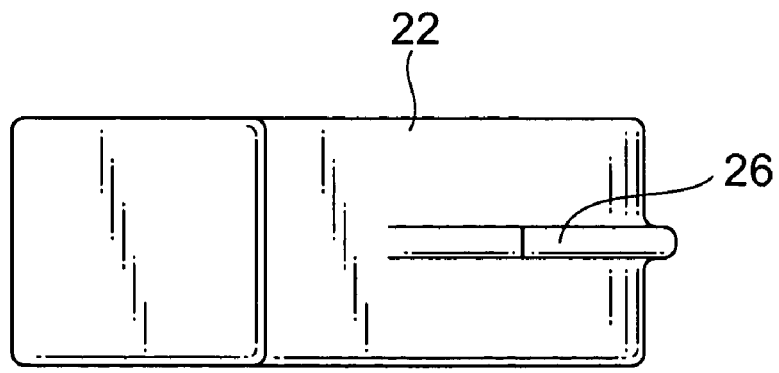
FIG. 3 is a view of the clip as seen in the direction of arrow III in FIG. 2.
Figure 4:
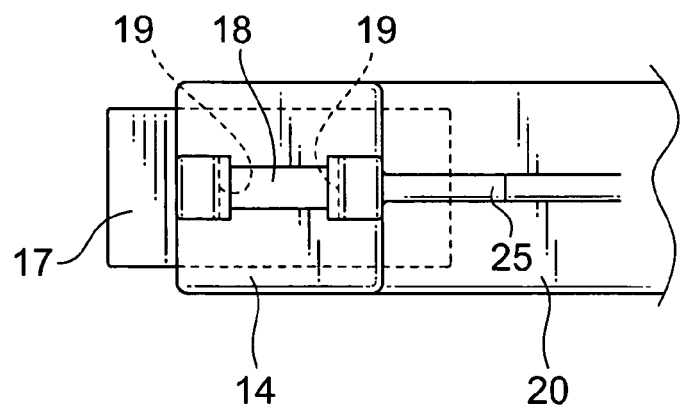
FIG. 4 is a view of the clip as seen in the direction of arrow IV in FIG. 2.
Figure 5:
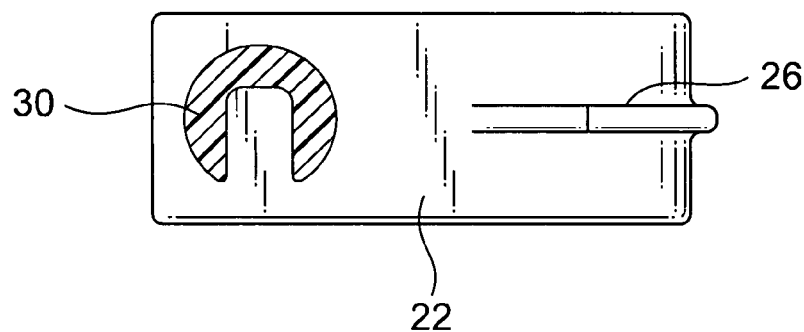
FIG. 5 is a cross-sectional view of the clip along line V-V in FIG. 2.

The following is a more detailed explanation of the garnish clip 10. The clip 10 is preferably an integrally molded product manufactured using injection molding. As shown in FIG. 2, it comprises a body attachment portion 11 for attachment to a portion of a vehicle body such as a front pillar 6, and a garnish attachment portion 13 for attachment to the garnish 7. The body attachment portion 11 has a head 14 with legs 15 below the head. The legs 15 have a pair of elastic pawls 16 extending upward and outward towards the head 14. The legs 15 preferably have a square shape in cross-section to prevent rotation once inserted into a square-shaped mounting hole in the pillar 6. A pair of plate-shaped elastic tabs 17 extend below the head 14 downward and outward. Along with pawls 16, the tabs 17 assist in securing the legs 15 inside a mounting hole in the pillar 6. The body attachment portion 11 can have a different configuration, however. For example, it can have an anchor shape for insertion into and engagement with a mounting hole in the pillar 6. The head 14 has a recess 18 at a position opposite to an end of the garnish attachment portion 13. A pair of latch shoulders 19 are formed in the recess 18.

The garnish attachment portion 13 comprises a plate-shaped base 20 connected at one end with the head 14 of the body attachment portion 11 and connected at an opposite end to one end of a plate-shaped garnish engagement portion 22 by a U-shaped connection 21, so as to oppose the base 20 as well as the head 14 of the body attachment portion 11. The garnish engagement portion has a pair of latch plates 23 at a position adjacent to the head 14 of the body attachment, so as to enable the plates to be inserted into the recess 18 on the head 14 and form a latch with shoulders 19. Pawls 24 on the tips of the latch plates 23 engage the shoulders 19 in the recess 18.

Figure 6:
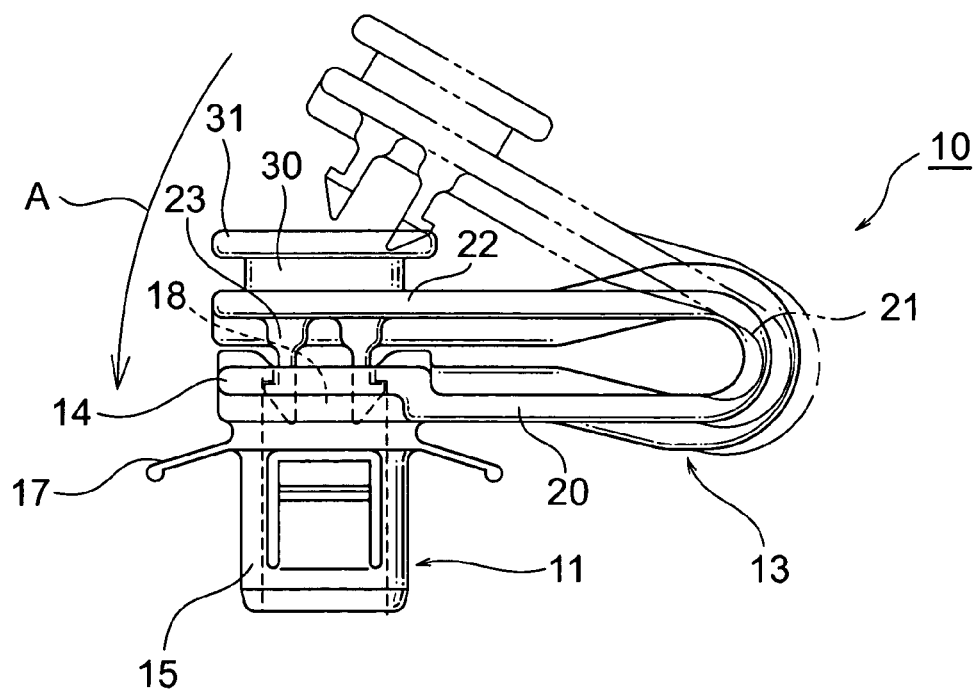
FIG. 6 is a front view of the clip in FIG. 2 with phantom lines showing the latch disengaged, and solid lines showing the latch engaged to latch the garnish engagement portion to the body attachment portion.

When plates 23 are inserted in recess 18 so that pawls 24 engage shoulders 19, as indicated by arrow A in FIG. 6, the garnish engagement portion 22 is latched to the head 14 of the body attachment portion 11. Although latch plates 23 are formed on the garnish attachment portion 13, and recess 18 is formed in the head 14 of the body attachment portion 11, the plates 23 could be formed on the body attachment portion 11, and the recess 18 could be formed on the garnish attachment portion 13. Although the latch uses a pair of latch plates, one or more plates can be used. Also, another type of latch can be used, such as a latch comprising engageable opposing plates on the garnish attachment portion and the body attachment portion (without a recess).

Figure 11:
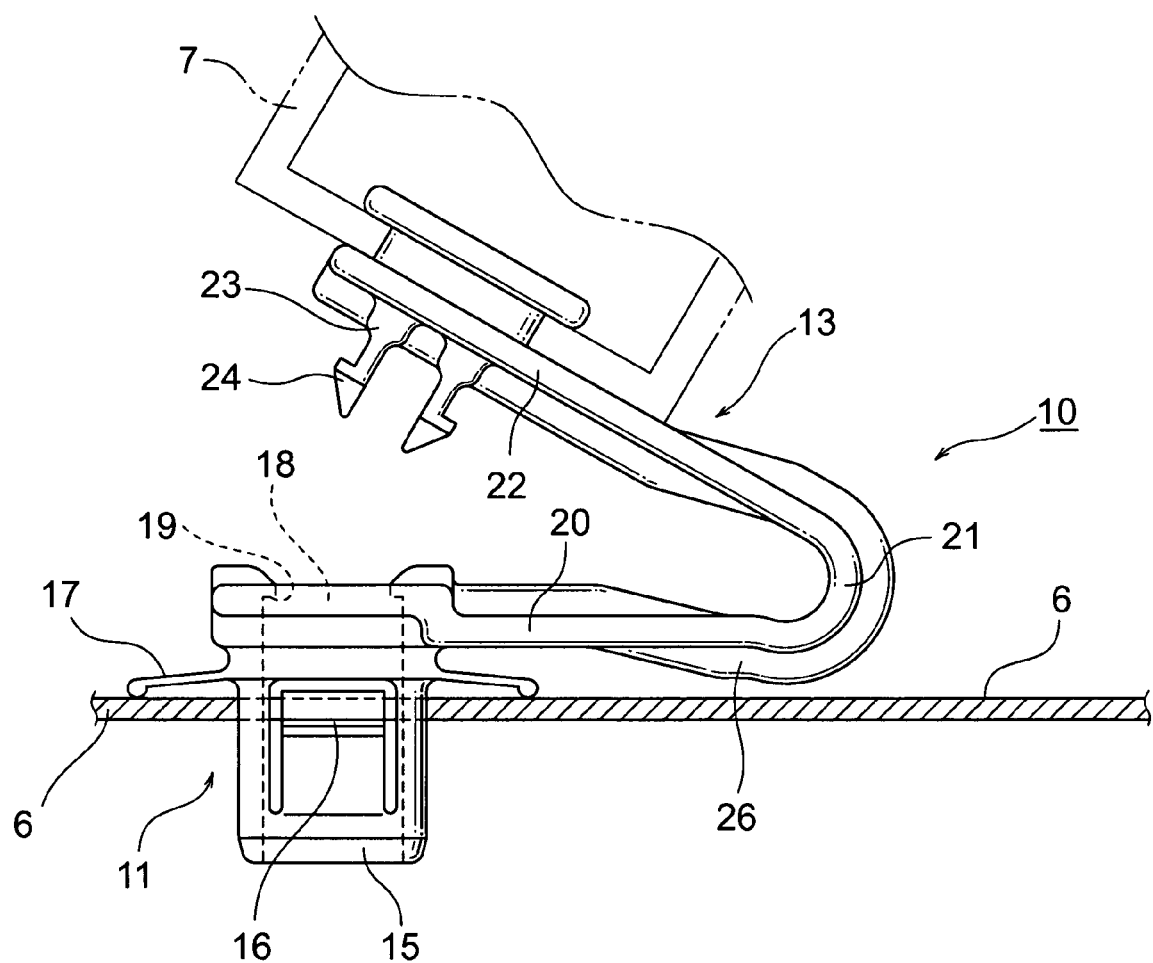
FIG. 11 is a front view similar to FIG. 8 but showing the latch released.

The engagement force engaging the pawls 24 on the plates 23 with the shoulders 19 in the recess 18 is made sufficient to maintain the latch engaged as long as there is no impact strong enough to deploy the curtain shield airbag. When an impact is sufficient to deploy the curtain shield airbag, the latch is released, and the garnish engagement portion 22 moves apart from the base 20 as shown in FIG. 11, to provide space between the garnish and the vehicle body for the deployment of the curtain shield airbag.

The garnish attachment portion 13 is rigid enough to resist further opening of the garnish engagement portion 22 away from the base 20. This rigidity is preferably provided by ribs (protrusions) 25, 26, 27 extending lengthwise along the base 20, U-shaped connection 21, and the garnish engagement portion 22. Ribs 25 and 27 protrude from opposing planes where the base 20 and the garnish engagement portion 22 oppose one another. Rib 26 protrudes and bends outward from the U-shaped connection 21. Thus, movement of a garnish away from the vehicle body is resisted, and movement of the garnish towards a vehicle occupant is limited.

Figure 7:
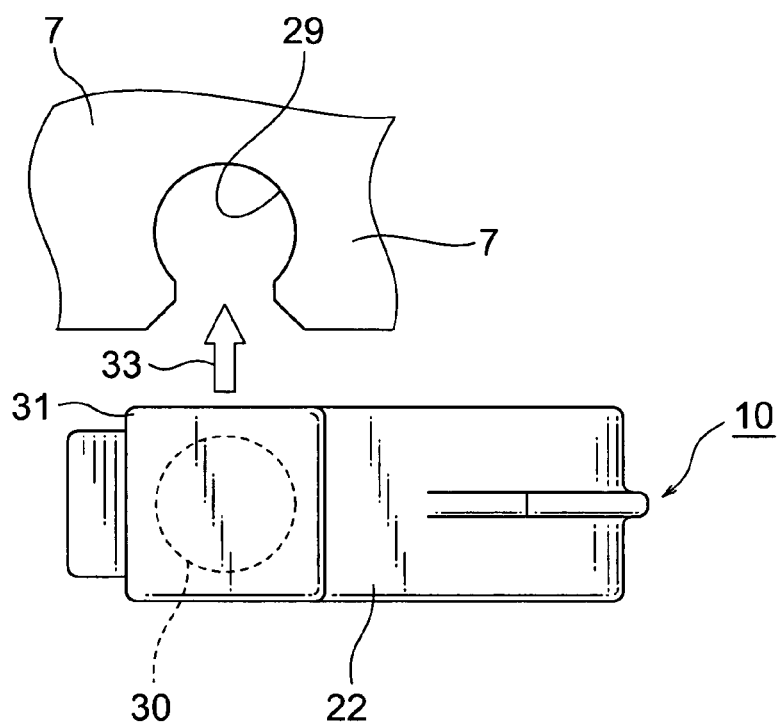
FIG. 7 is a diagram showing the clip in FIG. 2 being attached to a garnish.

The garnish attachment portion is flexible at the interfaces between the U-shaped connection 21 and the base 20 and the garnish engagement portion 22. The flexibility at the interfaces with the U-shaped connection 21 forms a hinge that allows the garnish engagement portion 22 to move away from the base 20 at an end of the body attachment portion 11. However, opening of the garnish engagement portion 22 away from the base 20 is resisted; movement of the garnish attached to the garnish attachment portion 11 away from the vehicle body is resisted; and movement of the garnish towards the vehicle occupant is resisted To connect the garnish 7 to the clip 10, a garnish insertion tube 30 is provided on the garnish engagement portion 22 for sliding engagement with a recess 29 in the garnish 7 (see arrow 33 in FIG. 7). The height of the insertion tube 30 depends on the thickness of the garnish, and a flange 31 is formed at the top to keep the tube from moving axially out of the recess 29. The tube 30 is preferably cylindrical with an outer diameter that allows the tube to be squeezed through a tapered entrance to the recess 29. When the tube fits in the recess 29, separation of the garnish 7 from the clip 10 is unlikely. Instead of tube 30 and recess 29, another mechanism can be used for connecting the garnish 7 to the clip 10, if desired.

Figure 8:
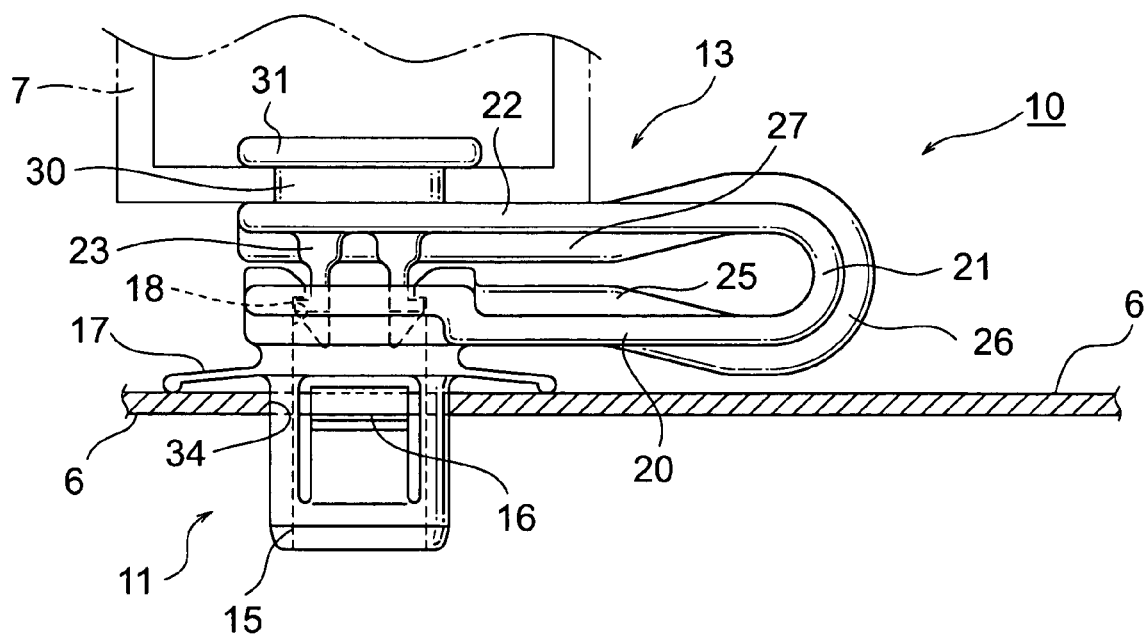
FIG. 8 is a front view showing a garnish attached to a front pillar using the clip in FIG. 2 and with the latch engaged as in FIG. 6.

The clip 10 of the present invention is preferably sent to a vehicle assembly line after it has been attached to a garnish 7. This saves time and effort compared to attachment of a clip to a garnish at the assembly line. As shown in FIG. 8, the garnish 7 is attached to the front pillar 6 using the clip 10 (and push-in fasteners 9). Legs 15 on the body attachment portion 11 of the clip 10 are inserted into an attachment hole 34 in the front pillar 6, so that pawls 16 engage regions of the attachment hole, and the elastic tabs 17 engage the front pillar 6, whereby the clip 10 is secured to the front pillar.

Figure 9:
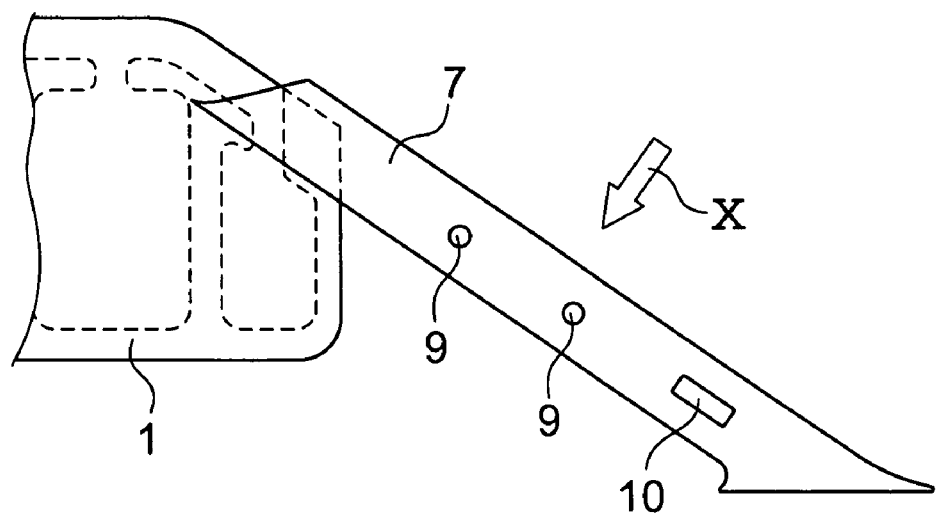
FIG. 9 is a diagram used to explain what occurs in the vicinity of the front pillar when the curtain shield airbag is deployed.
Figure 10:
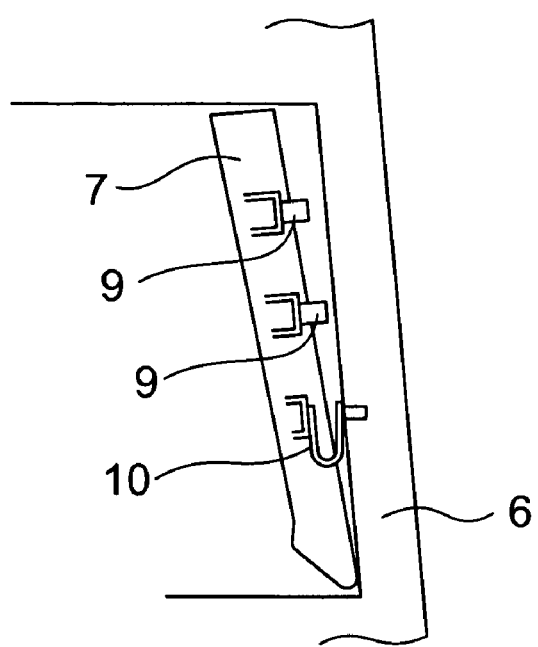
FIG. 10 is an explanatory diagram as seen in the direction of arrow X in FIG. 9.

FIG. 9 through FIG. 11 show what happens when impact on a vehicle in a collision or rollover causes rapid deployment of the curtain shield airbag 1 in order to protect the head of a vehicle occupant. As shown in FIG. 9, the curtain shield airbag 1 deploys downward from the portion housed by the garnish 7. As shown in FIG. 10, which is a view from arrow X in FIG. 9, the garnish 7 moves away from the front pillar 6, and the two fasteners 9 detach from the front pillar. However, the clip 10 of the present invention prevents the garnish 7 from coming off the front pillar 6.

As shown in FIG. 11, the latch plates 23 are released from shoulders 19 in the recess 18 when the garnish 7 is impacted by deployment of the curtain shield airbag. When the plates 23 are released, the ribs 25-27 provide rigidity to limit opening of the garnish engagement portion 22 away from the base 20. While maintaining space between the garnish engagement portion 22 and the pillar 6 for curtain shield airbag deployment, the garnish 7 restrains further approach of the airbag towards a vehicle occupant in order to minimize danger to the vehicle occupant.

While a preferred embodiment of the invention has been shown and described, changes can be made without departing from the principles and spirit of the invention, the scope of which is defined in the accompanying claims.

What is claimed is:

1. A garnish clip for attaching a garnish, that holds a curtain shield airbag, to a portion of a vehicle body, comprising:
    a body attachment portion for attachment to a vehicle body, and
    a garnish attachment portion for attachment to a garnish,
    wherein the garnish attachment portion comprises a base with one end connected to the body attachment portion and an opposite end connected to one end of a garnish engagement portion by a U-shaped connection, so that the garnish engagement portion opposes the base,
    wherein a latch includes cooperable parts disposed on the garnish engagement portion and the body attachment portion at positions opposing one another, whereby the garnish engagement portion is latched to the body attachment portion,
    wherein the latch is released when an impact force is sustained by the deployment of the curtain shield airbag so as to move the garnish engagement portion away from the body attachment portion, and
    wherein the garnish attachment portion, including the U-shaped connection, has stiffening elements that provide sufficient rigidity to the garnish attachment portion to limit movement of the garnish engagement portion away from the body attachment portion when the latch is released.

2. The clip described in claim 1, wherein the latch comprises latch plates extending from either the garnish engagement portion or the body attachment portion and latch shoulders on either the body attachment portion or the garnish engagement portion to engage pawls on the ends of the latch plates.

3. A garnish clip for attaching a garnish, that holds a curtain shield airbag, to a portion of a vehicle body, comprising:
    a body attachment portion for attachment to a vehicle body, and
    a garnish attachment portion for attachment to a garnish,
    wherein the garnish attachment portion comprises a base with one end connected to the body attachment portion and an opposite end connected to one end of a garnish engagement portion by a U-shaped connection, so that the garnish engagement portion opposes the base,
    wherein a latch includes cooperable parts disposed on the garnish engagement portion and the body attachment portion at positions opposing one another, whereby the garnish engagement portion is latched to the body attachment portion,
    wherein the latch is released when an impact force is sustained by the deployment of the curtain shield airbag so as to move the garnish engagement portion away from the body attachment portion,
    wherein the garnish attachment portion has sufficient rigidity to limit movement of the garnish engagement portion away from the body attachment portion when the latch is released, and
    wherein ribs extend lengthwise on the base, the U-shaped connection, and the garnish engagement portion, to provide rigidity to the garnish attachment portion that limits movement of the garnish engagement portion away from the body attachment portion when the latch is released.

4. The clip described in claim 1, wherein a garnish insertion tube is provided on the garnish engagement portion for sliding engagement with a recess in a garnish.

5. The clip described in claim 1, wherein the body attachment portion has a pair of legs with a corresponding pair of pawls for insertion into an attachment hole in the vehicle body.

6. A garnish clip for attaching a garnish, that holds a curtain shield airbag, to a portion of a vehicle body, comprising:
    a body attachment portion for attachment to a vehicle body; and
    a garnish attachment portion for attachment to a garnish,
    wherein the garnish attachment portion is constructed to provide a space for retaining a portion of an airbag, and has a latch that is released upon deployment of the airbag to expand the space to a limited extent, and to move a garnish away from the body attachment portion to a limited extent, and
    wherein the garnish attachment portion has ribs that limit said movement.

7. The clip described in claim 6, wherein the latch has cooperable parts on the body attachment portion and one end of the garnish attachment portion, and the garnish attachment portion has a hinge at an opposite end thereof that permits said movement.

* * * * *